United States Patent

Datta

[15] 3,676,361

[45] July 11, 1972

[54] TERNARY ALKALINE-EARTH PYROSILICATE LUMINESCENT MATERIALS ACTIVATED WITH DIVALENT EUROPIUM

[72] Inventor: Ranajit Kumar Datta, East Cleveland, Ohio

[73] Assignee: General Electric Company

[22] Filed: April 15, 1969

[21] Appl. No.: 816,273

[52] U.S. Cl. ...................................................252/301.4 F
[51] Int. Cl. ............................................................C09k 1/54
[58] Field of Search............................................252/301.4 F

[56] References Cited

UNITED STATES PATENTS

| | | | |
|---|---|---|---|
| 2,467,810 | 4/1949 | Cassanos et al. | 252/301.4 F |
| 3,544,481 | 12/1970 | Barry | 252/301.4 F |
| 3,544,482 | 12/1970 | Barry | 252/301.4 F |
| 2,297,108 | 9/1942 | McKeag et al. | 252/301.4 F |
| 3,294,699 | 12/1966 | Lange | 252/301.4 F |
| 3,503,894 | 3/1970 | Wachtel | 252/301.4 F |

OTHER PUBLICATIONS

Blasse et al., Fluorescence of Eu $^+$ − Activated Silicates Philips Research Reports, V. 23, No. 2, April, 1968, pages 189−200 pages 189, 190, 191 and 199

Barry, Equilibria and Eu $^+$ Luminescence of Solidus Phases Bounded by Ba MgS O Sr MgS O , and Cd MgSi O Journal of Electrochemical Society, July 1968 Vol. 115, No. 7, pages 733−738.

*Primary Examiner*—Robert D. Edmonds
*Attorney*—Henry P. Truesdell, Frank L. Neuhauser, Oscar B. Waddell, Joseph B. Forman, Melvin M. Goldenberg and John F. McDevitt

[57] ABSTRACT

Several ternary pyrosilicate compositions of the system MO-MgO-SiO$_2$ (M = Sr, Ba, Ca) of the general formula M$_2$MgSi$_2$O$_7$ were activated with divalent europium while maintaining the charge balance. Under cathode-ray, and long- and short-wavelength ultraviolet excitation, they show green and/or blue emission depending on the matrix involved. In the phosphors not containing barium, equivalent amounts of magnesium and silicon can be replaced by aluminum and the charge balance maintained. Some embodiments, especially those with high barium content, show good temperature-dependence characteristics, and this phosphor system is useful in fluorescent and high pressure mercury vapor lamps.

4 Claims, 6 Drawing Figures

EMISSION SPECTRA OF $M_{1.98}Eu_{0.02}MgSi_2O_7$ (M=Ca,Sr,Ba)

CHANGE IN POSITION AND INTENSITY OF PEAK EMISSION OF $Ca_{1.98-z'}Sr_{z'}Eu_{0.02}MgSi_2O_7$ AS $z'$ CHANGES.

1. z = 0.0
2. z = 0.48
3. z = 1.18
4. z = 1.48
5. z = 1.98

EMISSION SPECTRA OF $Sr_{1.98-z}Ba_zEu_{0.02}MgSi_2O_7$

Inventor:
Ranajit K. Datta
by Richard H. [signature]
His Attorney

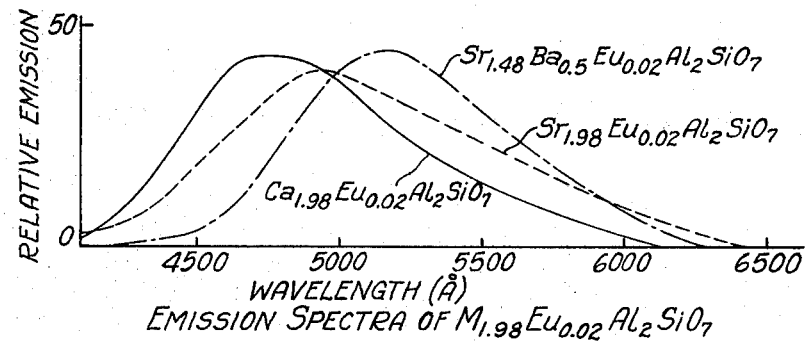
Fig. 4. Emission Spectra of $M_{1.98}Eu_{0.02}Al_2SiO_7$
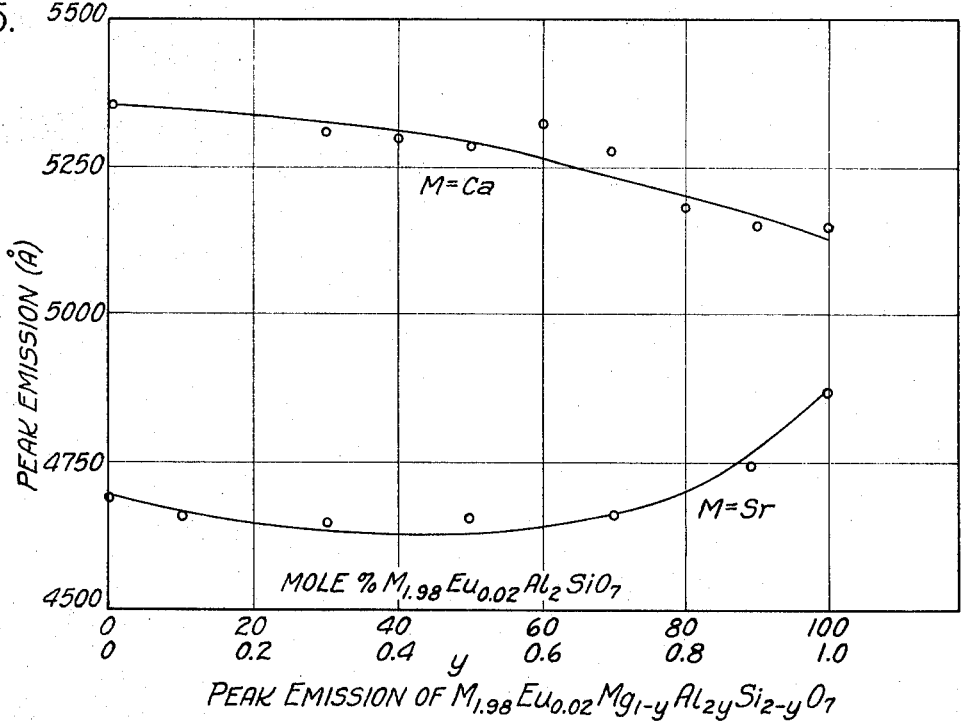
Fig. 5. Peak Emission of $M_{1.98}Eu_{0.02}Mg_{1-y}Al_{2y}Si_{2-y}O_7$
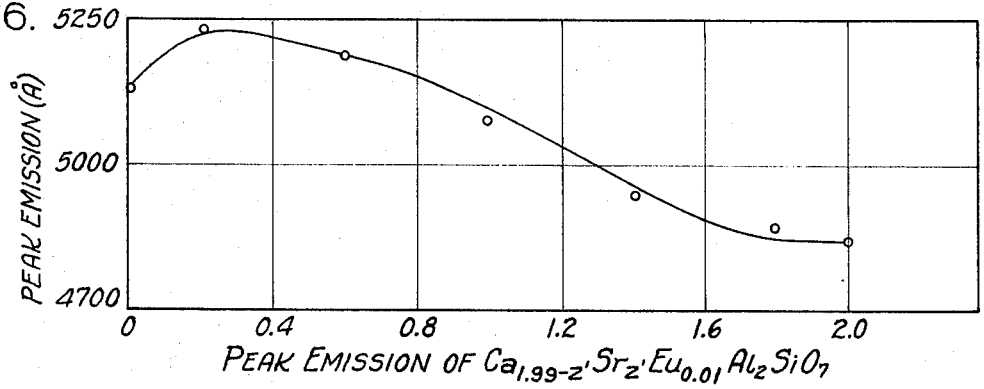
Fig. 6. Peak Emission of $Ca_{1.99-z'}Sr_{z'}Eu_{0.01}Al_2SiO_7$

TERNARY ALKALINE-EARTH PYROSILICATE LUMINESCENT MATERIALS ACTIVATED WITH DIVALENT EUROPIUM

BACKGROUND OF THE INVENTION

This invention relates to luminescent materials which convert ultraviolet radiations (both short- and long-wavelength), cathode rays and X-rays into visible radiations. More specifically, the invention relates to ternary alkaline-earth magnesium silicate phosphors.

The unactivated host matrices of the phosphors used in this invention, that is, the ternary magnesium silicates of the alkaline-earth metals, were reported by H. A. Klasens, A. H. Hoekstra and A. P. M. Cox in "Ultraviolet Fluorescence of Some Ternary Silicates Activated with Lead" in J. Electrochem. Soc., 104, 93 (Feb., Feb. 1957). Klasen et al. therein activated the ternary silicates with lead ($Pb^{+2}$) only and reported that the Pb-activated ternary, alkaline-earth silicates show ultraviolet fluorescence under short-wavelength (2,537 A) ultraviolet excitations.

An unactivated compound having the constituents $2SrO.Al_2O_3.3SiO_2$ is described by Dear in "X-Ray Diffraction Data for Silicates, Aluminates and Alumina-Silicates of Strontium," Bull. Va. Polytech. Inst., Vol. L, No. 6, April 1967.

Also, McKeag et al. United States Pat. No. 2,297,108 disclose binary alkaline-earth silicate phosphors, without any magnesium, activated with divalent europium ($Eu^{2+}$) and several other $Eu^{2+}$ activated compounds are known to emit in the blue to green region depending on the matrix.

SUMMARY OF THE INVENTION

It is an object of the present invention to provide silicate phosphors having useful and unique luminescent characteristics. A further object is to provide such phosphors whose emission peaks and temperature dependence characteristics can be varied usefully by changing the proportions of alkaline earths in the phosphor.

The present invention in certain of its embodiments provides luminescent materials which are crystalline compounds and have the general composition:

$$M_{2-x}A_xMg_{1-y}Al_{2y}Si_{2-y}O_7$$

wherein:
M is one or more of Ca, Sr, and Ba,
A is ($Eu_{1-a}^{+2}R_a$), R being one or more of $Mn^{2+}$ and $Sn^{2+}$, and $a$ being from zero to 0.02,
$x$ is from a small amount effective for luminescence up to 0.15,
$y$ is from zero to 1.0, and
when M is Ba alone, $y$ is zero.

The activator, A, which includes divalent europium is incorporated into the lattice of the compound.

Preferably, when M is a combination of Sr and Ba, the following relation applies:
M is $Sr_{2-z}Ba_z$, and
$z$ is between zero and 0.5.

As far as crystallographic structures of the fluorescent materials are concerned, particularly good products obtained by a process according to the present invention exhibit the X-ray diffraction spectra disclosed in the above-cited Klasens et al article of one or more of the following ternary compounds or their crystalline solutions which form in the composition ranges described above:

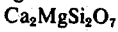
$Ca_2MgSi_2O_7$
$Ca_2Al_2SiO_7$
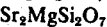
$Sr_2MgSi_2O_7$
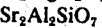
$Sr_2Al_2SiO_7$
$Ba_2MgSi_2O_7$ Various embodiments of the invention produce good phosphors, although the nature of their emission and temperature-dependence characteristics depend on the relative proportions of the alkaline-earth metals involved. It is possible that a process described herein may produce certain amounts of one or more of particular species which are largely responsible for the fluorescence of the products of the process. The reaction products, in addition to the preferred embodiments, may contain unreacted starting materials and their disintegration products, and small amounts of other compounds which emit less strongly.

BRIEF DESCRIPTION OF THE DRAWINGS

FIG. 4 is a graph of the emission spectra under 3,650 A excitation of three A1-containing phosphors of the invention.

FIG. 5 is a graph showing the shift in emission peak under 3,650 A excitation of two phosphors of the invention with varying A1 content.

FIG. 6 is a graph of the change in peak emission under 3,650 A excitation of an A1-containing phosphor of the invention with varying proportions of Ca and Sr.

DESCRIPTION OF THE PREFERRED EMBODIMENTS

The phosphors can be synthesized by a two-step firing process, provided certain critical precautions are observed. Appropriate amounts of the alkaline-earth carbonates, silica (or silicic acid) and europium trioxide ($Eu_2O_3$) are mixed and fired for several hours such as eight hours at a temperature between 900° and 1,250° C in air atmosphere; this is followed by grinding and a second firing under reducing conditions for about 2 hours at a temperature between 1,000°–1,200° C. If temperatures much below 900° C or much shorter times are used, or if grinding and refiring are omitted, undesirable metastable intermediate silicate phases are formed which have substantial deleterious effects on luminescent characteristics of the resulting material. Formation of these undesirable materials is enhanced if suitable fluxes such as alkaline-earth fluorides are not used. Reducing atmosphere critical to reducing europium to the divalent state can be created by flowing forming gas through or by burning high purity carbon in the semi-airtight reaction chamber.

After the desired heating interval the sample is brought out of the furnace and cooled in the same reducing atmosphere. If a flux is desired, a part of the alkaline-earth may be added as fluoride in the starting material. The incorporation of such flux materials reduces the temperature and time of heating intervals required to form the ternary silicates of the invention and improves the crystallinity of the fired products. However, the amount of the fluoride in moles should not exceed more than 10 percent of the sum total of the alkaline-earth metals.

The unactivated ternary silicates of the systems MO-MgO-$SiO_2$(M = Sr, Ba, Ca), such as $M_2MgSi_2O_7$, have a white body color, and they do not respond to cathode rays, X-rays, or long- or short-wavelength ultraviolet radiations.

When a small part of the alkaline-earth metal is substituted by $Eu^{2+}$, the silicates acquire a white to pale yellow body color and respond very well to cathode rays, X-rays, long- and short-wavelength ultraviolet radiations. The nature of the emission and the relative responses are functions of composition. The air fired samples show the typical $Eu^{3+}$ emission under cathode rays and short- and long-wavelength ultraviolet radiation.

Figure 1:
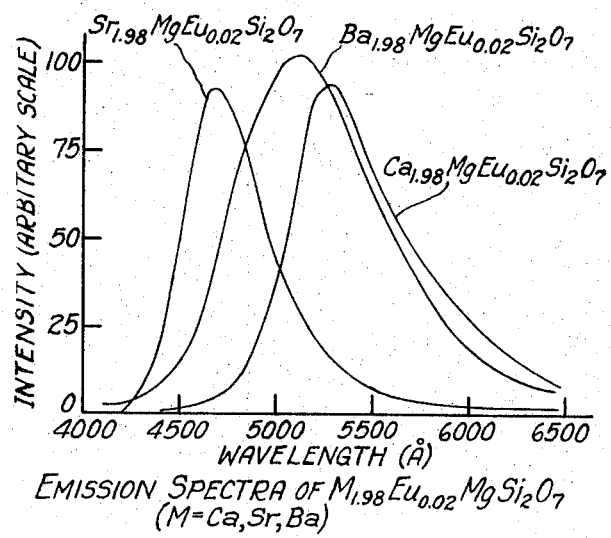
FIG. 1 is a graph of the emission spectra under 3,650 A excitation of the three phosphors of the invention wherein M is each of Ba, Ca and Sr individually and the $Eu^{+2}$ content is 0.02 moles per formula unit.

One preferred embodiment, $Ba_{2-x}Eu_xMgSi_2O_7$, responds very well to radiations with wavelength ranging from 1,800 to 4,000 A, the relative response is a function of the wavelength of the exciting radiation and the $Eu^{2+}$ content, $x$. The latter can be varied within wide limits; it has been observed that under 2,537 and 3,650 A excitation, the preferred values of $x$ can range from 0.005 to 0.15, with an optimum about from 0.01 to 0.08. This phosphor emits in a broad band extending from 4,300 A to 7,000 A with a peak at 5,050 A, as shown in FIG. 1. The band shape is essentially independent of the activator ($Eu^{2+}$) concentration and the wavelength of the exciting source. The total brightness of $Ba_{1.98}MgEu_{0.02}Si_2O_7$ measured through an eye sensitivity filter is about 90 percent of that of commercial $Zn_2SiO_4$:$Mn^{2+}$ under 2,537 A excitation. This phosphor shows good temperature stability: at 250° C the brightness under 3,650 and 2,537 A excitations are about 65 and 50 percent, respectively, of the maximum brightness under the corresponding radiation which occurs at room temperature.

Another preferred embodiment, $Sr_{2-x}Eu_xMgSi_2O_7$, when excited by cathode rays, X-rays, long- and short-wavelength ultraviolet radiations, emits in a broad band extending from 4,200 A to 6,000 A with a peak at 4,700 A, as shown in FIG. 1. Like the Barium Analogue, intensity of emission of $Sr_{2-x}MgEu_xSi_2O_7$ under various excitations is a function of the concentration $x$ of $Eu^{2+}$. The concentration can be varied within wide limits, preferably from 0.005 to 0.15, with an optimum about from 0.01 to 0.08.

Figure 2:
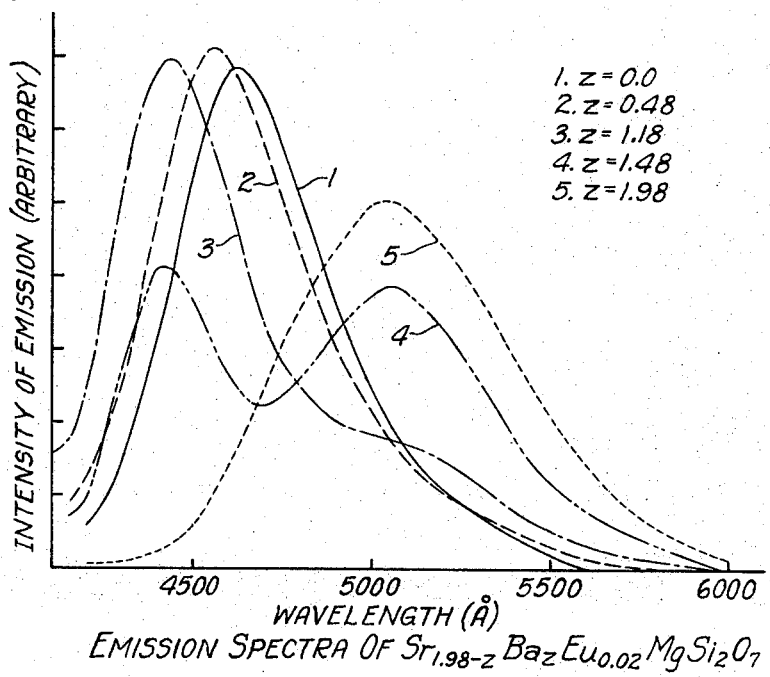
FIG. 2 is a graph of the emission spectra under 3,650 A excitation of five phosphors of the invention wherein M is different proportions of Sr and Ba. The samples shown in this figure were fired at 1,100° C.

Depending on the temperature of reaction, varying amounts of $Ba_{2-x}Eu_xMgSi_2O_7$ can be dissolved in the $Sr_{2-x}Eu_xMgSi_2O_7$ lattice: at 1,200° C, about 70 mole percent of $Ba_{1.98}Eu_{0.02}MgSi_2O_7$ can be dissolved in the $Sr_{1.98}Eu_{0.02}MgSi_2O_7$ lattice causing a shift in the peak emission of the latter embodiment toward shorter wavelength. FIG. 2 shows the emission spectra of several samples of the system $Sr_{1.98-z}Ba_zEu_{0.02}MgSi_2O_7$. These samples were prepared at 1,100° C. The peak emission of the embodiment, $Sr_{1.98-z}Ba_zEu_{0.02}MgSi_2O_7$, excited under 3,650 A radiation, shifts from 4,700 A to 4,350 A as $z$ increases from 0 to 0.98, as shown in FIG. 2. With further increase in $z$, the maximum possible solubility of Ba in the $Sr_{1.98}Eu_{0.02}MgSi_2O_7$ lattice at 1,100° C is reached and the barium analogue of the embodiment with its broad emission peaking at 5,050 A appears as an additional phase. Incorporation of barium in the $Sr_{1.98}Eu_{0.02}MgSi_2O_7$ lattice also improves the temperature-brightness relationship of the embodiment: under 3,650 A excitation at 50° C, $Sr_{1.98}Eu_{0.02}MgSi_2O_7$ shows 50 percent of its maximum brightness which occurs at room temperature, whereas, when the composition of the embodiment is changed to $Sr_{1.5}Ba_{0.48}Eu_{0.02}MgSi_2O_7$, the brightness at 50° C is about 65 percent of the maximum brightness which again occurs at room temperature. Solubility of $Sr_{1.98}Eu_{0.02}MgSi_2O_7$ in the $Ba_{1.98}Eu_{0.02}MgSi_2O_7$ lattice at 1,200° C is negligible.

Figure 3:
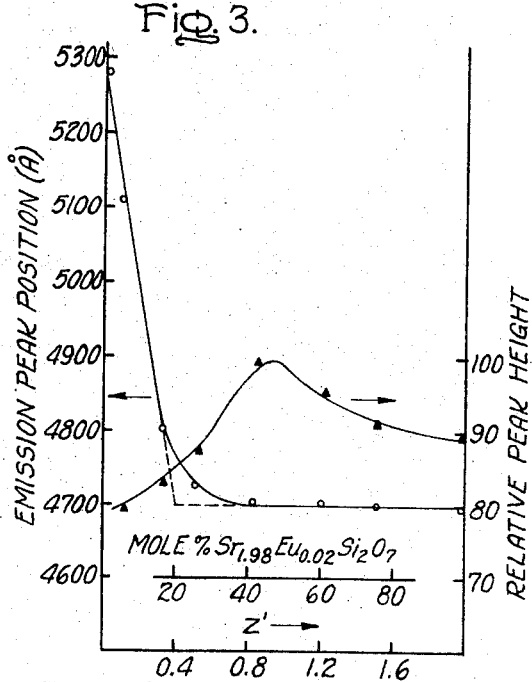
FIG. 3 is a graph of the change in total brightness and peak emission as proportions of Ca and Sr are changed in phosphors of the invention.

In $Ca_{1.98-z'}Sr_{z'}Eu_{0.02}MgSi_2O_8$, as $z'$ is increased from 0 to 1.98, the peak is shifted from 5,280 A to 4,700 A under 3,650 A excitation. The change in total brightness and peak position of these phosphors with change in $z'$ is shown in FIG. 3, with a maximum brightness at $z'$ of about 0.9.

The emission spectra of $Ca_{1.98}Eu_{0.02}Al_2SiO_7$, $Sr_{1.98}Eu_{0.02}Al_2SiO_7$, and $Sr_{1.48}Ba_{0.5}Eu_{0.02}Al_2SiO_7$ are shown in FIG. 4, with peaks respectively near 4,450, 4,800 and 5,250 A. These materials all have an off-white body color.

The shift in peak emission of $M_{1.98}Eu_{0.02}Mg_{1-y}Al_{2y}Si_{2-y}O_7$ wherein M is either Sr or Ca is shown in FIG. 5. Such a luminescent compound is not formed when M is Ba. However, small amounts of Ba can be incorporated in the lattice and substituted for Sr when M is Sr.

The change in peak emission of $Ca_{1.99-z'}Sr_{z'}Eu_{0.01}Al_2SiO_7$ with the varying of $z'$ is shown in FIG. 6.

In certain preferred embodiments, it has been found that at least 0.005 moles per formula unit $Eu^{2+}$, and up to 0.08 moles $Eu^{2+}$, are desirable. Preferred ranges of $y$ are between 0.005 and 0.5 moles per formula unit, equivalent to 0.01 to 1.0 moles Al. Furthermore, when $y$ is zero and M is $(Sr_{1-z}Ba_z)_{2-r}$, $z$ is preferably between zero and 0.75.

EXAMPLE I $Sr_{1.98}MgEu_{0.02}Si_2O_7$

A batch consisting of the following ingredients was mixed together and fired at 1,100° C for several hours such as 8 hours in air:
- 8.79 gm of $SrCO_3$
- 2.835 gm of Basic $MgCO_3$
- 0.1056 gm of $Eu_2O_3$
- 3.96 gm of Hydrated silica The basic $MgCO_3$ used in this application has 42.67 percent MgO by weight. The hydrated silica used has 98.6 percent $SiO_2$ by weight. The cooled sample was ground and refired at 1,050° C in reducing atmosphere for 1 to 2 hours. Straight forming gas 5 percent $H_2$, balance $N_2$, passed at a rate of 1,200 cc/min through the air-tight silica-glass reaction chamber was adequate to reduce $Eu^{3+}$ to $Eu^{2+}$. The sample was brought out of the furnace and cooled in the same reducing atmosphere. The final product was a white powder which on excitation under cathode rays or ultraviolet radiation showed a broad emission spectrum extending from 4,200 A to 6,000 A with a peak at 4,700 A.

EXAMPLE II $Ba_{1.965}MgEu_{0.035}Si_2O_7$

To demonstrate the use of $BaF_2$ flux, the following ingredients were mixed together and treated as described in Example I:
- 7.54 gm of $BaCO_3$
- 1.89 gm of Basic $MgCO_3$
- 2.64 gm of Hydrated silica
- 0.1232 gm of $Eu_2O_3$
- 0.175 gm of $BaF_2$ The final product was a pale yellow powder which showed well crystallinity under X-ray diffraction analysis. Under cathode rays and ultraviolet radiations, it showed a broad emission spectrum extending from 4,300 A to 7,000 A with a peak at 5,050 A. The total brightness of the sample with an eye sensitivity filter is about 75 percent of that of commercial $Zn_2SiO_4Mn^{2+}$.

EXAMPLE III $Ba_{1.98}Eu_{0.02}MgSi_2O_7$

This slight variation on Example II was made with the ingredients expressed in moles as follows:
- $BaCO_3$ 1.93 moles
- $BaF_2$ 0.05 moles
- $Eu_2O_3$ 0.01 moles
- $MgCO_3$ 1.0 moles
- $SiO_2$ 2.0 moles The results were essentially the same as stated for Example II.

EXAMPLE IV $Ba_{0.98}SrMgEu_{0.02}Si_2O_7$

The following ingredients were mixed together and fired in air atmosphere at 1,100° C for several hours:
- 4.44 gm of $SrCO_3$
- 5.79 gm of $BaCO_3$
- 2.835 gm of Basic $MgCO_3$
- 3.96 gm of Hydrated silica
- 0.1056 gm of $Eu_2O_3$ The sample was cooled, ground and refired at 1,050° C in a reducing atmosphere for 1 to 2 hours. The reducing atmosphere was created by burning pure carbon blocks inside the semi-airtight reaction vessel where the sample was placed in a separate container to prevent any physical contact with carbon. The whole reaction vessel containing the sample and the carbon block was taken out of the furnace and cooled. The phosphor sample obtained was of pale yellow color; when excited by cathode rays of ultraviolet radiation, it emitted in a broad band extending from 4,200 A to 6,000 A with a peak at 4,350 A.

EXAMPLE V $$Ca_{1.975}Eu_{0.02}Mn_{0.005}MgSi_2O_7$$

The batch ingredients used were:
5.93 gm of $CaCO_3$
2.83 gm of Basic $MgCO_3$
0.1056 gm of $Eu_2O_3$
0.0183 gm of $MnCO_3$ (58.1 percent MnO by weight)
3.96 gm of Hydrated silica The ingredients were mixed together and heated as described in Example I. The final product, a pale yellow polycrystalline material, showed two distinct emission bands under 2,537 A radiation —one band with a peak at 4,450 A ($Eu_2^+$), the other with a peak at 6,450 A (characteristic of $Mn^{2+}$).

EXAMPLE VI $$Ca_{0.99}Sr_{0.99}Eu_{0.02}Al_2SiO_7$$

The batch ingredients used were:
4.395 gm $SrCO_3$
2.99 gm $CaCO_3$
0.1056 gm $Eu_2O_3$
9.36 gm $Al_2O_3 \cdot 3H_2O$
1.98 gm Hydrated silica The ingredients were mixed and heated as in Example I. The final product, a pale yellow polycrystalline material, showed a broad emission with a peak at about 5,100 A under 2,537 and 3,650 A excitation.

What I claim is:

1. Luminescent material consisting essentially of a crystalline compound having the general composition:

$$M_{2-x}A_xMg_{1-y}Al_{2y}Si_{2-y}O_7$$

wherein
M is one or more of Ca, Sr, and Ba,
A is ($Eu^{2+}_{1-a}R_a$), R being $Sn^{2+}$, and a being from zero to 0.02,
x is from a small amount effective for luminescence up to 0.15,
y is from 0.005 to 0.5.

2. Luminescent material according to the formula:

$$M_{2-x}Eu_xAl_2SiO_7$$

wherein
M is one or more of Ca and Sr and
x is from a small amount effective for luminescence up to 0.15.

3. Luminescent material according to claim 2 in which M is Sr.

4. Luminescent material according to claim 2 in which M is Ca.

* * * * *